United States Patent
Abdi Taghi et al.

(10) Patent No.: US 11,362,828 B2
(45) Date of Patent: *Jun. 14, 2022

(54) SYSTEMS AND METHODS FOR AUTHENTICATED COMMUNICATION SESSIONS

(71) Applicant: Capital One Services, LLC, McLean, VA (US)

(72) Inventors: Fardin Abdi Taghi, Champaign, IL (US); Jeremy Goodsitt, Champaign, IL (US); Vincent Pham, Champaign, IL (US); Anh Truong, Champaign, IL (US); Austin Walters, Savoy, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/016,743

(22) Filed: Sep. 10, 2020

(65) Prior Publication Data

US 2021/0067343 A1 Mar. 4, 2021

Related U.S. Application Data

(63) Continuation of application No. 16/560,259, filed on Sep. 4, 2019, now Pat. No. 10,805,083.

(51) Int. Cl.
*H04L 9/00* (2022.01)
*H04L 9/32* (2006.01)

(52) U.S. Cl.
CPC .......... *H04L 9/3213* (2013.01); *H04L 9/3247* (2013.01)

(58) Field of Classification Search
CPC ........................ H04L 9/3213; H04L 9/3247
See application file for complete search history.

(56) References Cited

U.S. PATENT DOCUMENTS

| | | | |
|---|---|---|---|
| 8,254,542 | B2 | 8/2012 | Frederick |
| 8,548,432 | B2 | 10/2013 | Keast et al. |
| 9,742,559 | B2 | 8/2017 | Christodorescu et al. |
| 10,805,083 | B1 * | 10/2020 | Abad ................. H04L 9/3213 |
| 2009/0025075 | A1 | 1/2009 | Chow et al. |
| 2009/0217039 | A1 * | 8/2009 | Kurapati ............ H04L 63/1441 |
| | | | 713/168 |
| 2014/0033292 | A1 | 1/2014 | Moore et al. |
| 2015/0244711 | A1 | 8/2015 | Venkataraman et al. |

(Continued)

OTHER PUBLICATIONS

Thornton, Scott, "Arm TrustZone explained," Microcontroller Tips—An EE World Online Resource, Dec. 28, 2017, retrieved from https://www.microcontrollertips.com/embedded-security-brief-arm-trustzone-explained/, 8 pages.

*Primary Examiner* — Alexander Lagor
(74) *Attorney, Agent, or Firm* — Banner & Witcoff, Ltd.

(57) ABSTRACT

Aspects of this disclosure relate to authenticating a communication session. In some variations, a secured hardware storage area may be utilized to store at least one key credential. A communication session may be established from an enterprise associated application. To verify the authenticity of the communication session, a customer system and a host enterprise system may exchange a token. The token which may be signed with a key credential to validate a communication session. Additional validation data may be exchanged between operators of the customer system and a host enterprise system.

19 Claims, 5 Drawing Sheets

(56) References Cited

U.S. PATENT DOCUMENTS

| | | |
|---|---|---|
| 2015/0381621 A1 | 12/2015 | Innes et al. |
| 2016/0105290 A1 | 4/2016 | Khalil et al. |
| 2017/0250812 A1 | 8/2017 | Schefenacker et al. |
| 2017/0277831 A1 | 9/2017 | Ruff et al. |
| 2018/0183793 A1 | 6/2018 | Mandadi et al. |
| 2018/0285555 A1 | 10/2018 | Dong et al. |
| 2021/0051012 A1* | 2/2021 | Law .................. G06Q 20/4014 |

* cited by examiner

SYSTEMS AND METHODS FOR AUTHENTICATED COMMUNICATION SESSIONS

CROSS-REFERENCE TO RELATED APPLICATION

This application claims priority to U.S. Non-Provisional patent application Ser. No. 16/560,259, filed Sep. 4, 2019, the disclosure of which is incorporated by reference herein in its entirety and made part hereof.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF USE

Aspects of the disclosure relate generally to communication security and more specifically to authenticating a phone call or other communication session to or from an enterprise network device.

BACKGROUND

Increasingly, phone calls are used in a variety of scams designed to create unauthorized access to financial information. The source of a communication may spoof a phone number or a text identifier associated with a communication. For example, a scammer who has obtained certain personal customer information may call a bank with a spoofed phone number associate with a customer. Communications technology increasingly utilizes computer networks, and technologies such as web based calling systems and Voice over IP (VOIP) ease the ability to insert or alter identifiers associated with communications. Aspects described herein may address these and other problems, and generally improve the security of communications between two parties that are not able to otherwise verify each other's identities.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

The system may include a service provider application running on customer apparatus, that is associated with a customer account. The customer computing device may include a secure hardware portion for conducting secure communications, including the storage of authenticators used to securing communications. Authenticators may be received from a related enterprise computing device based on customer credentials. Authenticators may be stored in a secure hardware location of the customer apparatus. Based on a determination of the initiation of a communication session, a customer and an enterprise may exchange a token or other session identifier. The customer computing device may receive sign the token with an authenticator and return the signed token to the enterprise system. Based on that signed token, an authenticated communication session may be established. The system may exchange additional authorization information, such as a call validity time or an authentication code that may be exchanged between the parties.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for authenticating a phone call or other communication sessions to or from an enterprise network device. Systems as described herein may include secure hardware for use in securing and authenticating communications, which may related to confidential material, between a client or customer and an enterprise or service provider. Such systems may include a service provider application running on customer apparatus, which is associated with a customer account. The customer computing device may include a secure hardware portion, which may include a separate secure memory and one or more secure processors for conducting secure communications, including the storage of authenticators used to securing communications. Authenticators may be received from a related enterprise computing device based on customer credentials provided by application. Authenticators may be stored in a secure hardware location of the customer apparatus. Based on a determination of the initiation of a communication session, a customer and an enterprise may exchange a token or other session identifier. The customer computing device may receive sign the token with an authenticator and return the signed token to the enterprise system. Based on that signed token, an authenticated communication session may be established. The system may exchange additional authorization information, such as a call validity time or authentication codes.

Before discussing these concepts in greater detail, however, several examples of a computing device that may be used in implementing and/or otherwise providing various aspects of the disclosure will first be discussed with respect to FIG. 1.

Figure 1:
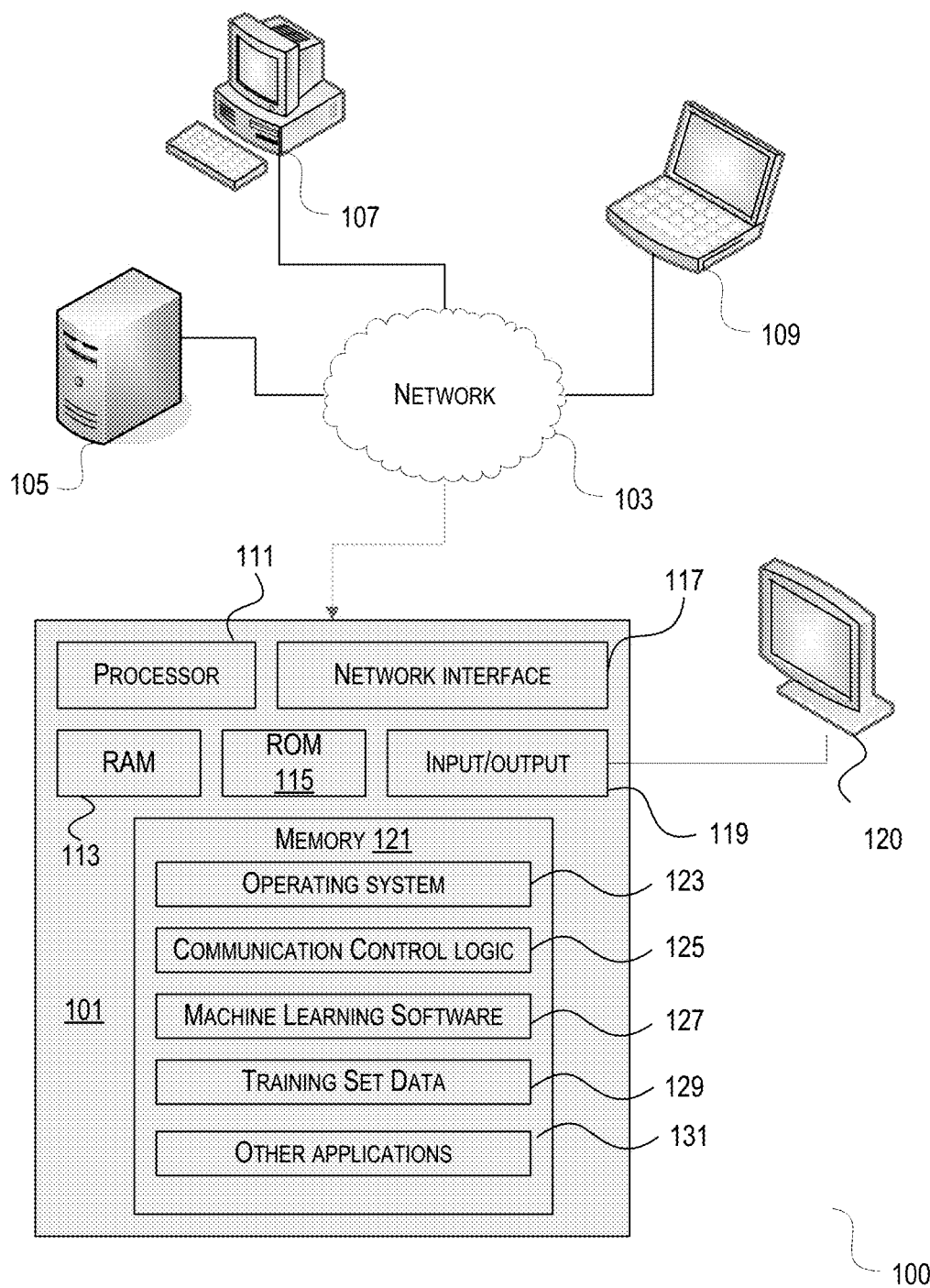
FIG. 1 shows an example of processing system in which one or more aspects described herein may be implemented.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), a personal assistant computing device (e.g. Amazon Alexa or Google Home), and/or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wide area networks (WAN), wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 2. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, a communication control application or control logic 125 for instructing computing device 101 to perform aspects discussed herein, machine learning software 127, training set data 129, and other applications 131. The machine learning software 127 may be incorporated in and may be a part of communication control application 125. The machine learning software 127 and training set data 129 may also be provided as a web service, or may be stored in a networked computer that provides feedback data and updates to the communication control application 125, including identifying situations in which additional authenticators are necessary by identifying anomalous or high risk communications. The other applications 131 may be interfaced by the communication control application 125. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or software 127.

Devices 101, 105, 107, 109 may request or receive requests for data sharing sessions, validate data sharing session requests, and/or obtain data as described herein. Devices 101, 105, 107, 109 may include distributed network systems that may store, modify, and/or execute distributed ledgers and/or smart contracts as described herein. A distributed network system may be publicly accessible and/or have restricted access. Access to a distributed network system may be limited to particular data sharing devices and/or account server systems. The data sharing devices and/or account server systems may be associated with a particular sharing session. Devices 101, 105, 107, 109 may include account server systems may store a variety of data, maintain a distributed ledger, execute smart contracts, establish data sharing sessions, and/or request verification of a data sharing session as described herein. However, it should be noted that any device in the data sharing system 100 may perform any of the processes and/or store any data as described herein. Some or all of the data described herein may be stored using one or more databases. Databases may include, but are not limited to relational databases, hierarchical databases, distributed databases, in memory databases, flat file databases, XML databases, NoSQL databases, graph databases, and/or a combination thereof.

The data transferred to and from various computing devices in data sharing system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption may be used in file transfers to protect the integrity of the data such as, but not limited to, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the data sharing system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware accelerated SSL and HTTPS, WS-Security, and/or firewalls. Such specialized hardware may be installed and configured in the data sharing system 100 in front of one or more computing devices such that any external devices may communicate directly with the specialized hardware.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2A:
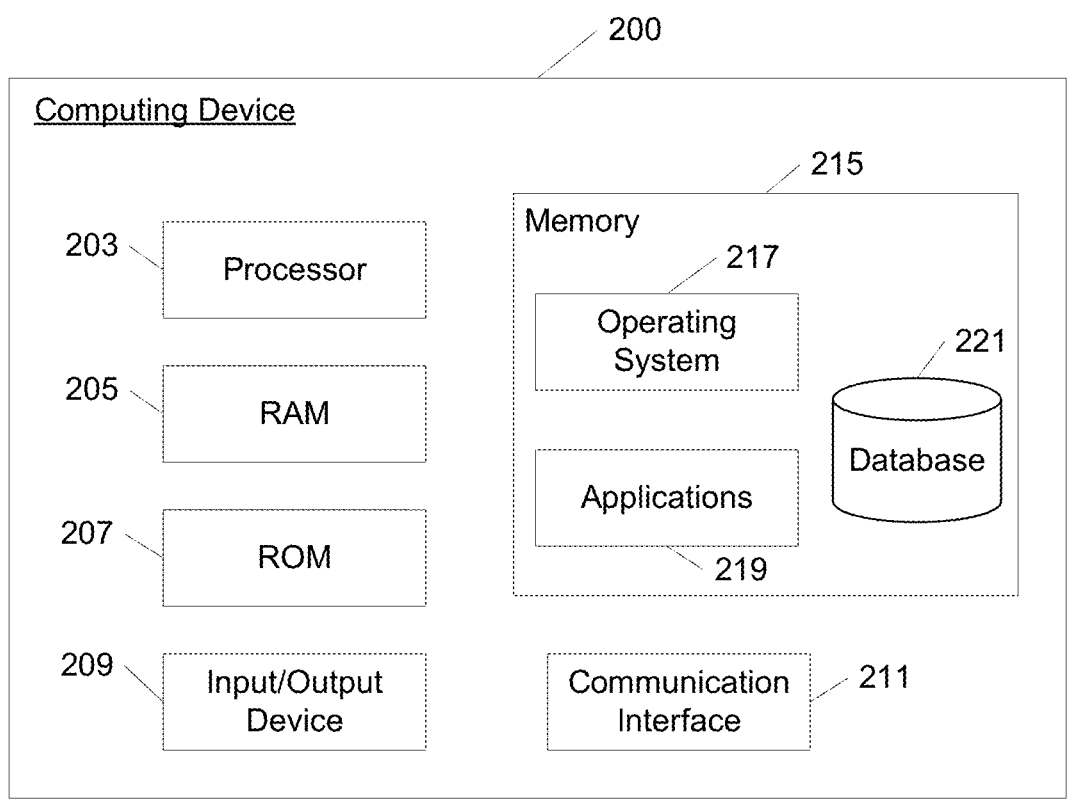
FIG. 2A shows an example computing device in accordance with one or more aspects described herein.

Turning now to FIG. 2A, a computing device 200 that may be used with one or more of the computational systems is described. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. Memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2A, various elements within memory 215 or other components in computing device 200, may include one or more caches including, but not limited to, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Figure 2B:
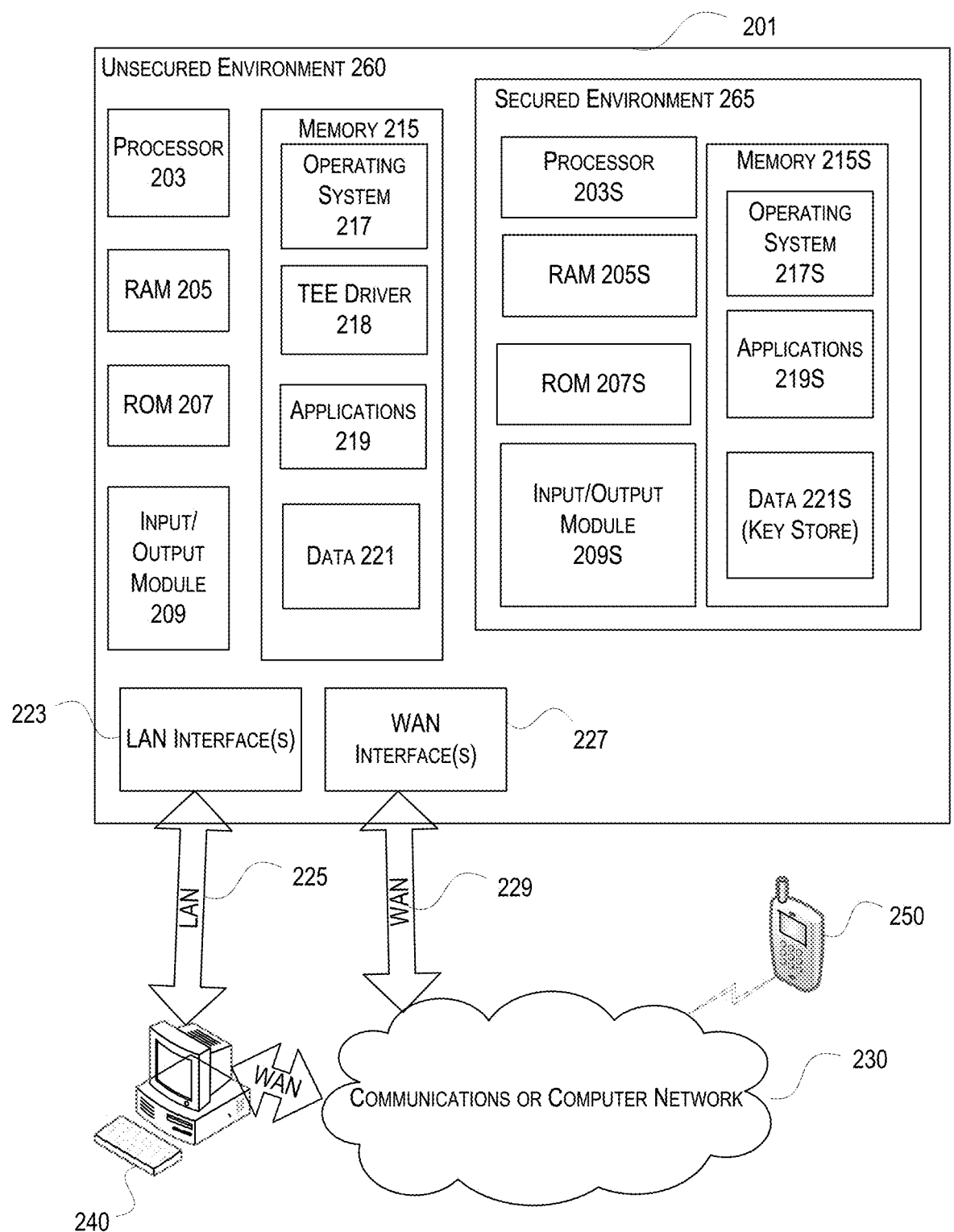
FIG. 2B shows an example computing device with a secured environment in accordance with one or more aspects described herein.

Turning now to FIG. 2B, a computing device 201 that may be used with one or more of the computational systems is described. The computing device 201 may include a processor 203 for controlling overall operation of the computing device 201 and its associated components, including RAM 205, ROM 207, input/output device 209, communication interface 211, and/or memory 215. A data bus may interconnect processor(s) 203, RAM 205, ROM 207, memory 215, I/O device 209, and/or communication interfaces such as LAN Interface 223 and/or Wide Area Network (WAN) Interface 227. The LAN Interface 223 may communicate with a LAN network 225 with another computing device 240 and may have one or more of any known LAN topology and may use one or more of a variety of different protocols, such as Ethernet. The WAN Interface 227 may communicate with a WAN network 229 and/or a plurality of other communications or computer networks 230 with another computing device 240 or 250 and may have one or more of any known WAN topology and may use one or more of a variety of different protocols, such as Internet Protocol (IP). Communication interfaces 223/227 may include one or more transceivers, digital signal processors, and/or additional circuitry and software for communicating via any network, wired or wireless, using any protocol as described herein. In some embodiments, computing device 201 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 201 may provide input, and may also include one or more of a speaker for providing audio output and a video display device for providing textual, audiovisual, and/or graphical output. Software may be stored within memory 215 to provide instructions to processor 203 allowing computing device 201 to perform various actions. For example, memory 215 may store software used by the computing device 201, such as an operating system 217, Trusted Execution Environment (TEE) driver 218, application programs 219, and/or an associated internal data store 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Processor 203 may include a single central processing unit (CPU), which may be a single-core or multi-core processor, or may include multiple CPUs. Processor(s) 203 and associated components may allow the computing device 201 to execute a series of computer-readable instructions to perform some or all of the processes described herein. Although not shown in FIG. 2B, various elements within memory 215 or other components in computing device 201, may include one or more caches, for example, CPU caches used by the processor 203, page caches used by the operating system 217, disk caches of a hard drive, and/or database caches used to cache content from database 221. The CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server.

The TEE driver 218 may provide interface hardware and/or software for communicating between an unsecured environment 260 and a secured environment 265. The secured environment 265 may operate as a trusted execution environment for processing and storage operations related to sensitive data, including storing authenticators and generating signed session identifiers such as signed session tokens. The secured environment 265 may be implemented as a system-on-chip (SoC) and may include specialized secured hardware for hardware-enforced isolation of sensitive data. The secured environment 265 may be implanted using technology such as ARM TrustZone technology, Intel Trusted Execution Technology, or AMD Secure Execution Environment. Similar to the unsecured environment 260, the secured environment 265 may include or more processors 203S, the computing device 201 and its associated components, including RAM 205S, ROM 207S, input/output modules 209S and/or memory 215S. The memory 215S may store software used in secured environment 265, such as a secured operating system 217S, secured application programs 219S, and/or a secured data store 221S. The secured data store 221S may store authenticators such as authentication and/or encryption keys. A customer installed application associated with an enterprise may be stored in at least one of an unsecured memory 215 and a secured memory 215S. For example, public data and generic functionalities of the application may be stored in the unsecured memory 215, and private customer data and security and authentication functionalities may be stored in the secured memory 215S.

Although various components of computing device 201 are described separately, functionality of the various components may be combined and/or performed by a single component and/or multiple computing devices in communication without departing from the invention.

Figure 3:
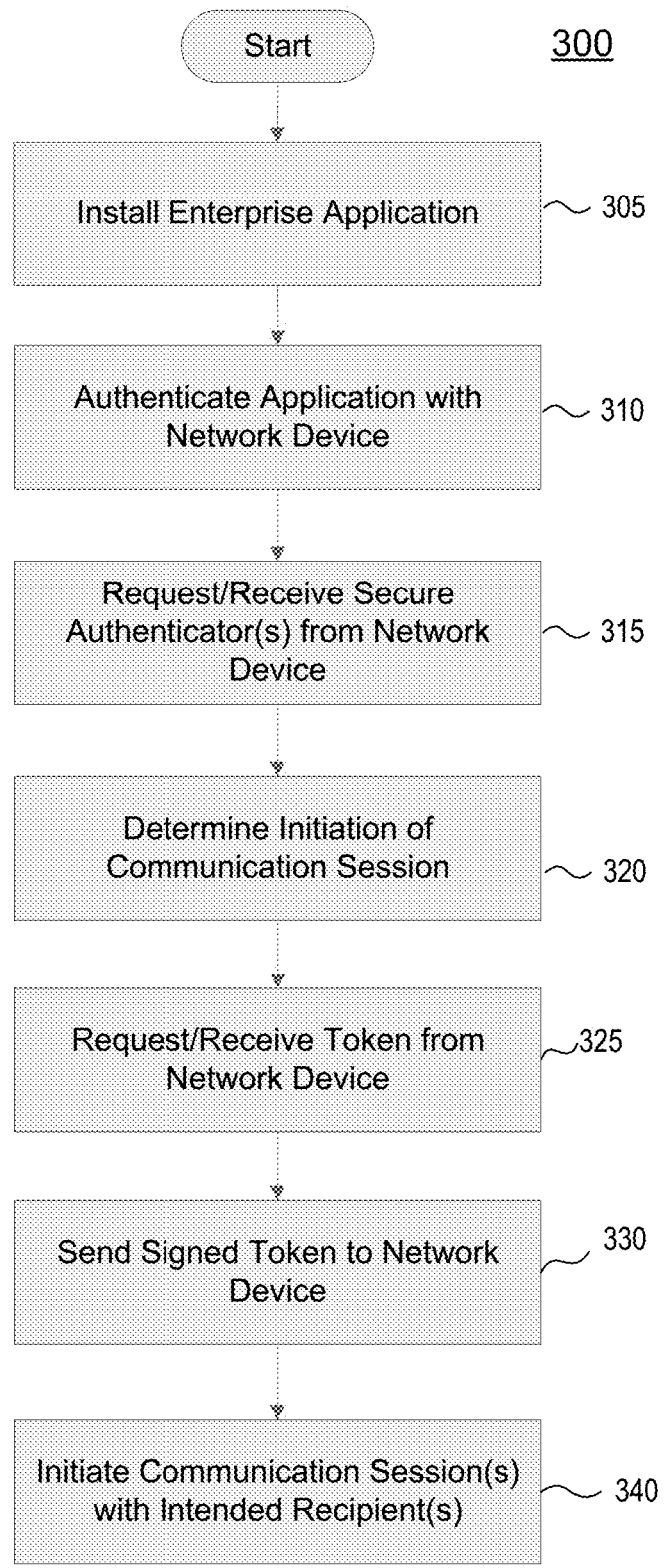
FIG. 3 shows a flow chart of a process for initiating an authenticated communication session with an enterprise network device according to one or more aspects of the disclosure.

An enterprise associated application may be installed on a customer computing device, which may include a secure hardware portion. The secure hardware portion may store security and/or authentication information communication sessions with an enterprise network device. FIG. 3 shows a flow chart of a process 300 for initiating an authenticated communication session with an enterprise network device according to one or more aspects of the disclosure. Some or all of the steps of process 300 may be performed using one or more computing devices as described herein. For example, a customer computing device, which may include secure hardware portion, may include an application for communicating and processing data from enterprise network devices.

In step 305, an application associated with an enterprise may be installed on a customer communication device. For example, a banking application may be installed to allow a customer computing device to perform a variety of banking related tasks. The application may allow the customer to retrieve or interact with sensitive data stored in an enterprise network device.

In step 310, the application may be authenticated with the enterprise network device. The application may create an account with an enterprise network device based on an authentication credential such as a username and password. The system may also use additional authentication credentials for securing account access, including biometric indicators that may be stored in a secured memory of a mobile computing device. The authentication credential may be stored and confirmed by an enterprise network server. The authentication credential data may be exchanged between the customer computing device and an enterprise network device using encrypted communications.

In step 315, the application may request and receive authenticators, which may be an encryption authenticator, from an enterprise network device or security provider network device. The authenticators may include one or more keys which may be provided in a certificate. The certificate may be digital document that may be generated by an enterprise network device, and may include identification data associated with the enterprise network that may be recognized by the application on the customer computing device to identify the issuer of the certificate. The application may be configured to automatically request an authenticator during an initial use of the application. The received authenticator may be stored in hardware of a secured environment of a customer computing device.

In step 320, the application may determine the initiation of a communication session. The communication session may be initiated from inside the application. The application may be configured to send a request for a communication session to a network device. The communication session may also be determined by monitoring outgoing communications for data indicating a contact within an enterprise network associated with the application. For example, a phone number associated with the enterprise network may be stored as a contact in a mobile device, and the application may monitor at least one communication application to determine if the customer computing device is attempting to initiate a communication session with the enterprise network contact within the enterprise associated with the application. Machine leaning software may be used to associate communications with an enterprise computing device with a contact to be monitored. The machine learning software may associate contacts with the enterprise associated application, so that further communication sessions with an enterprise computing device initiated outside of the application may be secured using the application. This monitoring may be based on communication destination identification data. Communication destination identification data known to be associated with an enterprise computing device may be provided as part of training set data for the machine learning software.

In step 325, the application may request and receive a session identifier, which may include a token. A token may be a session identifier such as a JSON Web Token (JWT), which may be associated with transmissions of a particular communication session. A token may be used to add a state to an otherwise stateless communication protocol. The token may be transmitted by the enterprise network device or a security provider network device.

In step 330, the application may sign the session identifier with the received authenticator and transmit the signed authenticator. For example, the application may sign a session token with a private key. Based on a signed session key, the application, or another application associated with the user of the application, may receive communication session authorization data or validation data. Such communication session authorization data may include an authorized time that may be used to define an authorized time window for validly initiating a communication session. The communication session authorization data may also be a code sent to a texting application or email application with data to be entered in the application to authorize the communication session. The communication session authorization data may be required to be transmitted to an enterprise network device with a signed token. The validation data may include identification data to be used by at least one of the parties of the communication session, such as a caller or call receiver, to validate the identity of anther party to initiate the communication, and/or verify the identity of another party. For example, the application may securely transmit and/or receive validation data from an enterprise network device, such that the parties may request the other party to identify themselves with the validation data, which may be a special code or personally identifying data. The application may include a computer operated voice recognition system that require the validation data to be spoken before the communication session begins. The verification data that may be shared after initiation of the communication session.

In step 340, the application may initiate a communication session, which may include a voice or video communication session, with the intended recipient. The initiation of the communication may include the receipt of authorized time data, which may be passed in a message with the signed token. The time data may include an authorized time window during which the communication session must be initiated. Such data may be used to authorize a communication function within the application. The application may receive an authorization code to be entered with the communication session, such as a numerical code to be entered as a phone call is initiated or a password that may be requested from or confirmed by another party of the communication.

Figure 4:
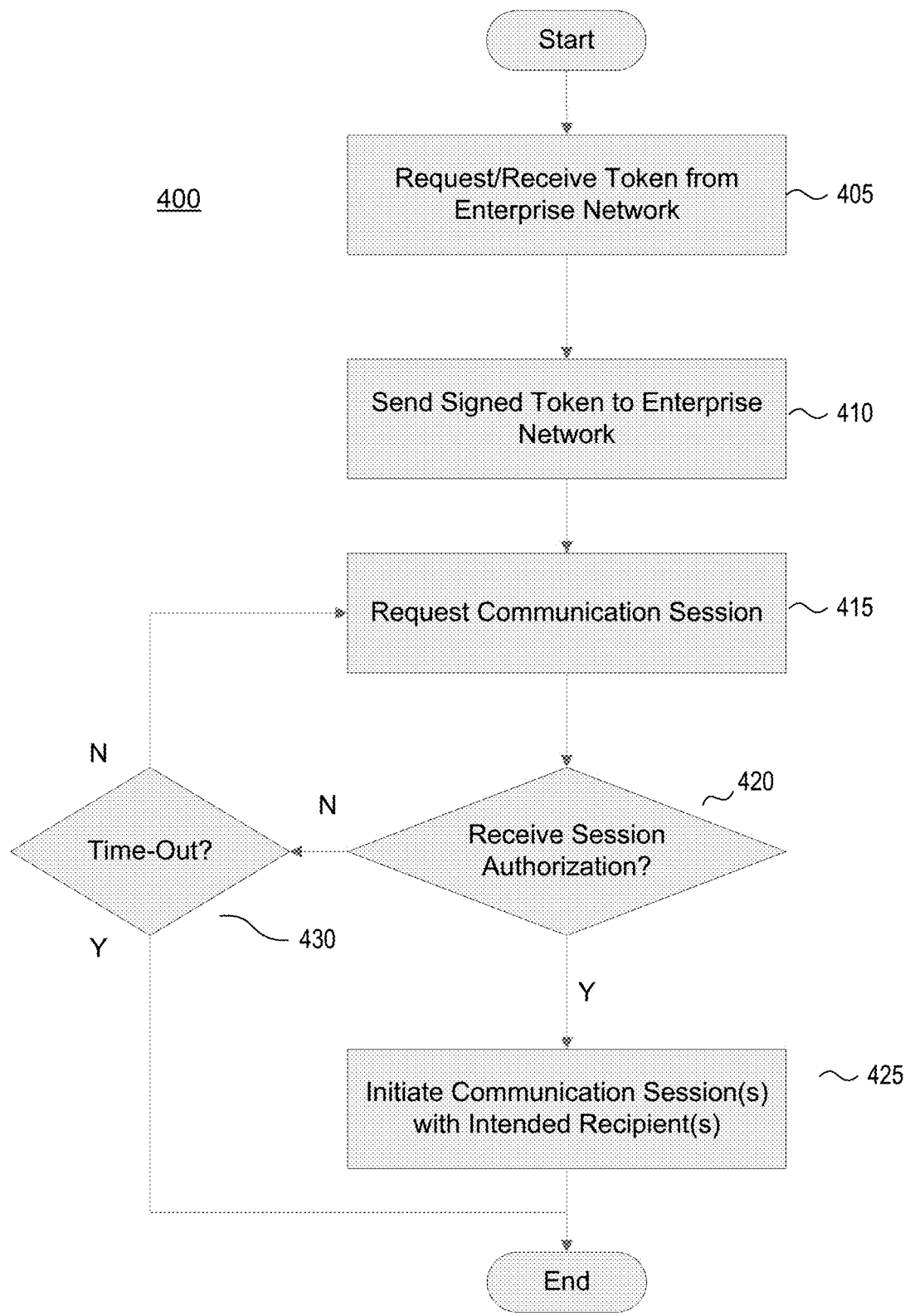
FIG. 4 shows a flow chart of a process for securing an authenticated communication session according to one or more aspects of the disclosure.

FIG. 4 shows a flow chart of a process 400 for securing an authenticated communication session with an enterprise network device according to one or more aspects of the disclosure. Some or all of the steps of process 400 may be performed using one or more computing devices as described herein.

In step 405, an application may request and/or receive a session token, or a session identifier, which may be received from an enterprise network device associated with the application. The application may request and/or receive a token or other session identifier based on an action detected by the customer computing device, such as an application sign on with a username and password or application access based on a confirmation of biometric security authentication. In some situations, the application may be passively monitoring other communications applications to determine if a communication session with an enterprise network device is being initiated.

In step 410, the application may sign the session token with a customer computing device associated authenticator, such as a private key. The application may transmit the signed token to an enterprise network device. The token may be transmitted from a security computing device that is not the enterprise network device that the customer communicates with during a communication session.

In step 415, the application may send a request for a communication session to an enterprise network device. The request may be transmitted based on a request for an appointment or a request to begin a communication session. The request may identify a plurality of types of communication sessions, or may include a request for a particular type of communication session. For example, the request may be a request for a phone call to a particular contact that is associated with an enterprise network. The request may be a video communication request may be made for a video session that may have the ability to share a screen view, which may be chosen by a user of the customer computing device or a user of an enterprise network device, in order to present account information on a shared view display.

In step 420, the application may monitor a connection, such as a connection with the enterprise network associated with the application, to determine if the application has received or retrieved session authorization data. The application may receive authorized time data which may define a time window for initiating a communication session, or may receive other authorization such as a verification code to be used in the initiated communication. The application may verify that a current time is within an authorized time window. The authorized time window may be displayed in the application to indicate to the customer computing device when the authorized time window will close. The application may receive an authorization code as session authorization data to be entered with the communication session, such as a numerical code to be entered as a phone call is initiated or a password that may be requested from or confirmed by another party of the communication. The authorization code may be caused to be displayed by the application, such that the authorization code may be read or entered by the user of the application or entered as a response using a keyboard of another device, such as a personal computer. The application may require that the authorization code is entered or confirmed within a predetermined period of time, and that period of time may be set based on a transmission time from an enterprise network device.

In step 425, the application may, based on determining the receipt of session authorization data, initiate a communication with the intended recipient. The initiation of the communication may include a check to determine if the current time is within receipt of authorized time data, which may be passed in a message with the signed token. The session authorization data may include a password or other authorization data required for initiation of the communication session. The session authorization data may be transmitted to the application, or may be transmitted via another communication method to the account holder. For example, the session authorization data may be texted to the phone number associated with the account holder or may be emailed to the account holder, and may be entered by a user in the application to initiate the communication session. The session authorization data may also be transmitted to the application to allow an application user to initiate a communication session in the application. Based on the receipt of session authorization data, the application may allow the communication session to begin. The application may require the session authorization data to be received before allowing a communication initiation function to be selected. The application may terminate the session authorization data to be received before allowing a communication initiation function to be selected.

In step 430, the application may determine whether session authorization data has been received within a set period of time from the initial request. The application may require the communication session authorization data or validation data to be received by the application within a certain period of time, or the session authorization data may be required to be received and confirmed to the enterprise network through a defined method within a certain period of time. Based on a determination that the session authorization data is not received or confirmed within a set period of time, the application may, in step 430, determine if the call initiation process has timed out.

That is, the application may monitor a connection time for the application with the enterprise network device associated with the application. If the application determines that the application has not received, retrieved, or entered session authorization data or validation data within a certain period of time, the application may indicate a time out and the application may terminate the communication request process. The process termination by the application may require a new user authentication, a new session token, or a new request for a communication session. The application may also indicate the need for a request for new session authorization data or session validation data. The application may request new communication session authorization data or validation data. The application may provide a user of the customer computing device the opportunity to re-request a communication session.

Based on a determination that the session authorization data is not received or confirmed the entry of session validation within a set period of time since the request for the communication session was received, the request for a communication session may be determined to have timed out and the request for a communication session may be terminated. Based on a determination that the session authorization data is not received or confirmed but a set period of time since the request for the communication session was received has not elapsed, the request for a communication session may repeated in step 415. Based on the repeated request for a communication session, a request for new session authorization data may be transmitted by the application to an associated enterprise network.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method comprising:
    transmitting, by a computing device and to a network system associated with a service provider, a user authentication credential;
    receiving, by the computing device and from the network system, at least one key credential;
    detecting, by an application running on the computing device and after receiving the at least one key credential, a request to initiate a communication session between the computing device and the service provider using a communication application, wherein the communication session is one or more of: a voice call, or a video call; and
    in response to determining that the request to initiate the communication session indicates contact information associated with the service provider, and before initiating the communication session:
        receiving, by the application running on the computing device, from the network system associated with the service provider, and via a connection with the network system, a session token;
        signing the session token with the at least one key credential; and
        transmitting, via the connection with the network system and to the network system associated with the service provider, the signed session token so as to authenticate the communication session; and
        initiating, via the communication application and after transmitting the signed session token, the communication session between the computing device and the service provider;
        receiving, by the application running on the computing device, service provider identification data indicating an identity of the service provider; and
        displaying, by the computing device and after detecting the request to initiate the communication session, the service provider identification data.

2. The method of claim 1, wherein transmitting the user authentication credential comprises:
    receiving, by the computing device and from at least one input interface of the computing device, the user authentication credential;
    generating, by the computing device, a session token request based on the user authentication credential; and
    transmitting, by the computing device, the session token request to the network system.

3. The method of claim 1, further comprising:
    receiving, by the computing device and after transmitting the signed session token, an indication that the communication session has been authenticated.

4. The method of claim 1, wherein detecting the request to initiate the communication session comprises:
    determining, by the application running on the computing device, that the communication session has been initiated by the communication application.

5. The method of claim 1, wherein detecting the request to initiate the communication session comprises:
    receiving, in the application running on the computing device, an input initiating the communication session.

6. The method of claim 1, wherein the contact information comprises a phone number associated with the service provider.

7. The method of claim 1, wherein the application running on the computing device is associated with the service provider.

8. The method of claim 1, wherein the network system comprises at least one service provider network server.

9. An apparatus comprising:
    one or more processors; and
    memory, comprising instructions that, when executed by the one or more processors, cause the apparatus to:
        transmit, to a network system associated with a service provider, a user authentication credential;
        receive, from the network system, at least one key credential;
        detect, after receiving the at least one key credential, a request to initiate a communication session between the apparatus and the service provider using a communication application, wherein the communication session is one or more of: a voice call, or a video call; and
        in response to determining that the request to initiate the communication session indicates contact information associated with the service provider, and before initiating the communication session:
            receive, from the network system associated with the service provider and via a connection with the network system, a session token;
            sign the session token with the at least one key credential; and
            transmit, via the connection with the network system and to the network system associated with the service provider, the signed session token so as to authenticate the communication session; and
            initiate, via the communication application and after transmitting the signed session token, the communication session between the apparatus and the service provider;
        receive service provider identification data indicating an identity of the service provider; and
        display, after detecting the request to initiate the communication session, the service provider identification data.

10. The apparatus of claim 9, wherein the instructions, when executed by the one or more processors, cause the apparatus to transmit the user authentication credential by causing the apparatus to:
    receive, from at least one input interface, the user authentication credential;
    generate a session token request based on the user authentication credential; and
    transmit the session token request to the network system.

11. The apparatus of claim 9, wherein the instructions, when executed by the one or more processors, cause the apparatus to:

receive, after transmitting the signed session token, an indication that the communication session has been authenticated.

12. The apparatus of claim 9, wherein the instructions, when executed by the one or more processors, cause the apparatus to detect the request to initiate the communication session by causing the apparatus to:
   determine that the communication session has been initiated by the communication application.

13. The apparatus of claim 9, wherein the instructions, when executed by the one or more processors, cause the apparatus to detect the request to initiate the communication session by causing the apparatus to:
   receive an input initiating the communication session.

14. The apparatus of claim 9, wherein the contact information comprises a phone number associated with the service provider.

15. One or more non-transitory computer-readable media comprising instructions that, when executed by a computing device, cause the computing device to:
   transmit, to a network system associated with a service provider, a user authentication credential;
   receive, from the network system, at least one key credential;
   detect, after receiving the at least one key credential, a request to initiate a communication session between the computing device and the service provider using a communication application, wherein the communication session is one or more of: a voice call, or a video call; and
   in response to determining that the request to initiate the communication session indicates contact information associated with the service provider, and before initiating the communication session:
   receive, from the network system associated with the service provider and via a connection with the network system, a session token;
   sign the session token with the at least one key credential; and
   transmit, via the connection with the network system and to the network system associated with the service provider, the signed session token so as to authenticate the communication session; and
   initiate, via the communication application and after transmitting the signed session token, the communication session between the computing device and the service provider;
   receive service provider identification data indicating an identity of the service provider; and
   display, after detecting the request to initiate the communication session, the service provider identification data.

16. The computer-readable media of claim 15, wherein the instructions, when executed, cause the computing device to transmit the user authentication credential by causing the computing device to:
   receive, from at least one input interface, the user authentication credential;
   generate a session token request based on the user authentication credential; and
   transmit the session token request to the network system.

17. The computer-readable media of claim 15, wherein the instructions, when executed, cause the computing device to:
   receive, after transmitting the signed session token, an indication that the communication session has been authenticated.

18. The computer-readable media of claim 15, wherein the instructions, when executed, cause the computing device to detect the request to initiate the communication session by causing the computing device to:
   determine that the communication session has been initiated by the communication application.

19. The computer-readable media of claim 15, wherein the instructions, when executed, cause the computing device to detect the request to initiate the communication session by causing the computing device to:
   receive an input initiating the communication session.

* * * * *